Figure 1:
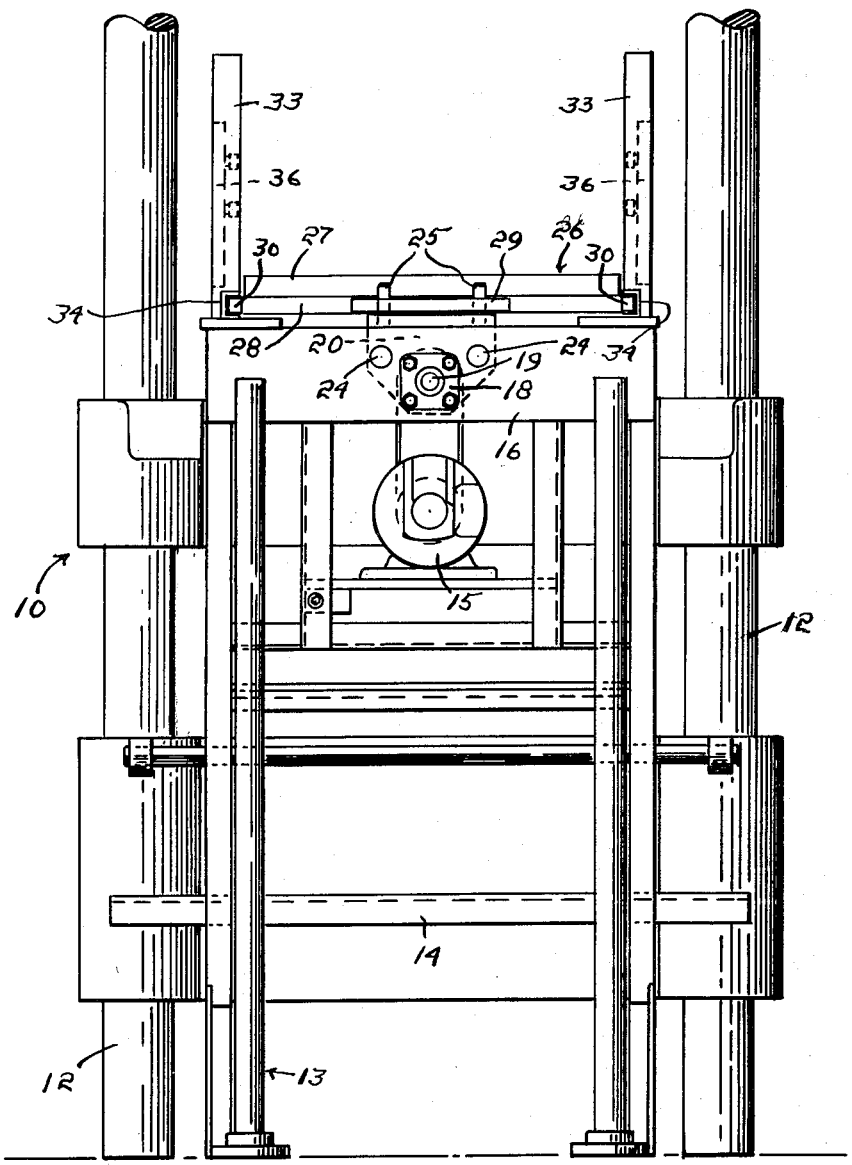

INVENTORS
ROBERT B. YAHN
ALLISON R. DORMAN JR.
BY
ATTORNEY

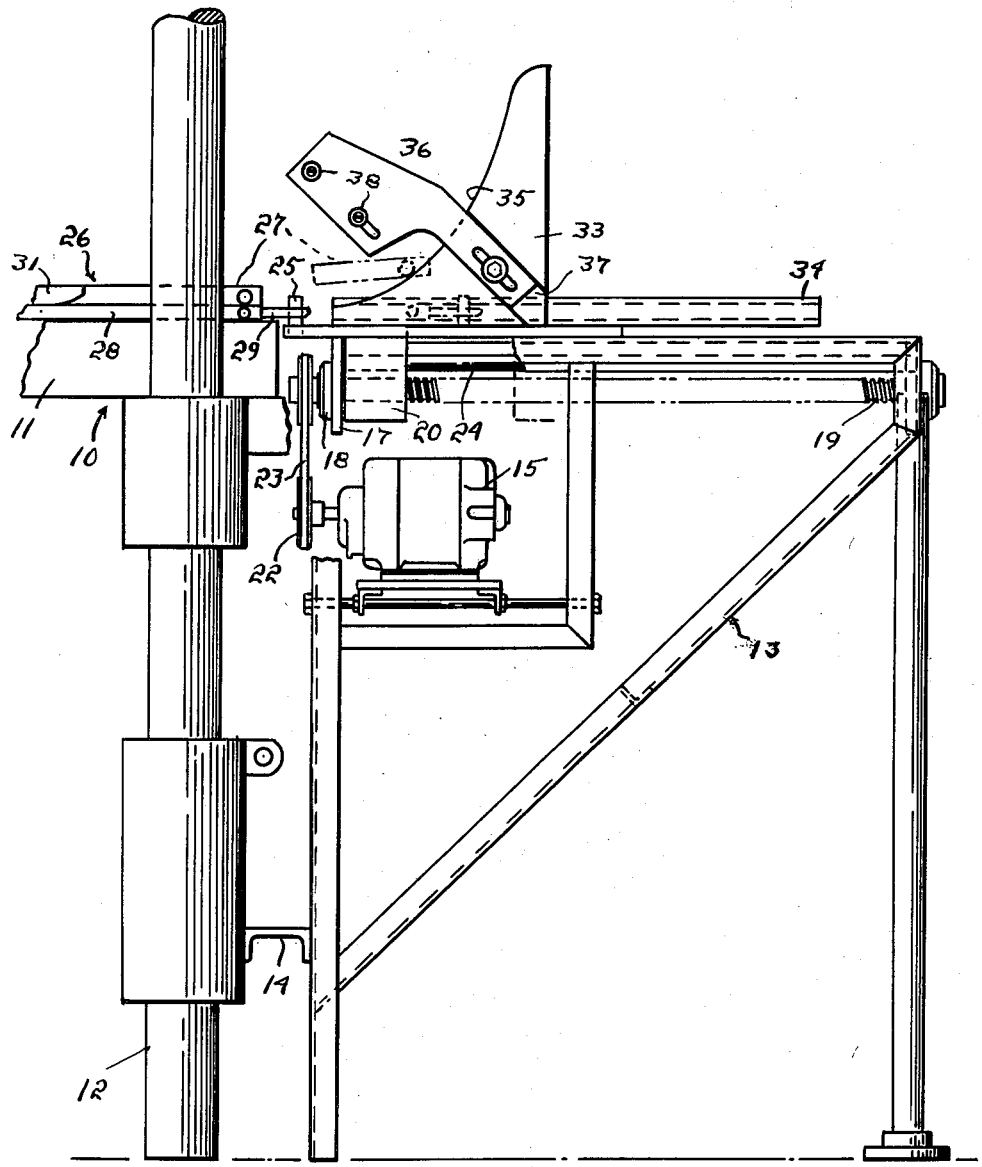

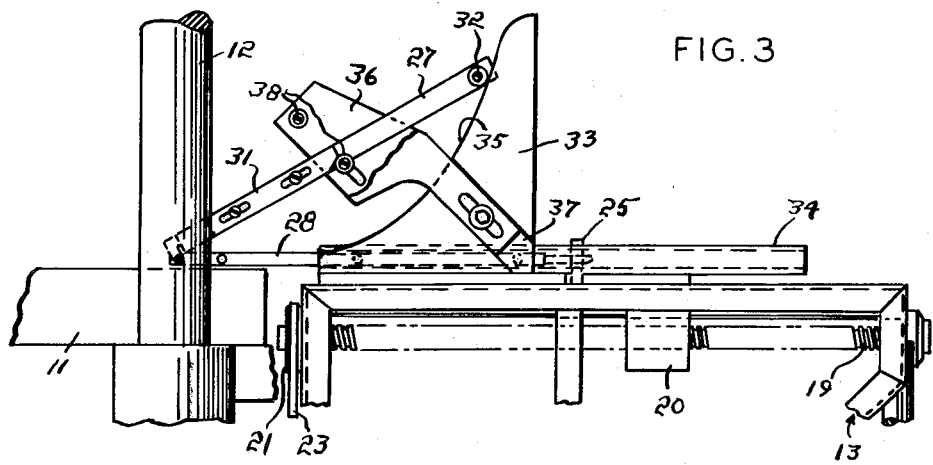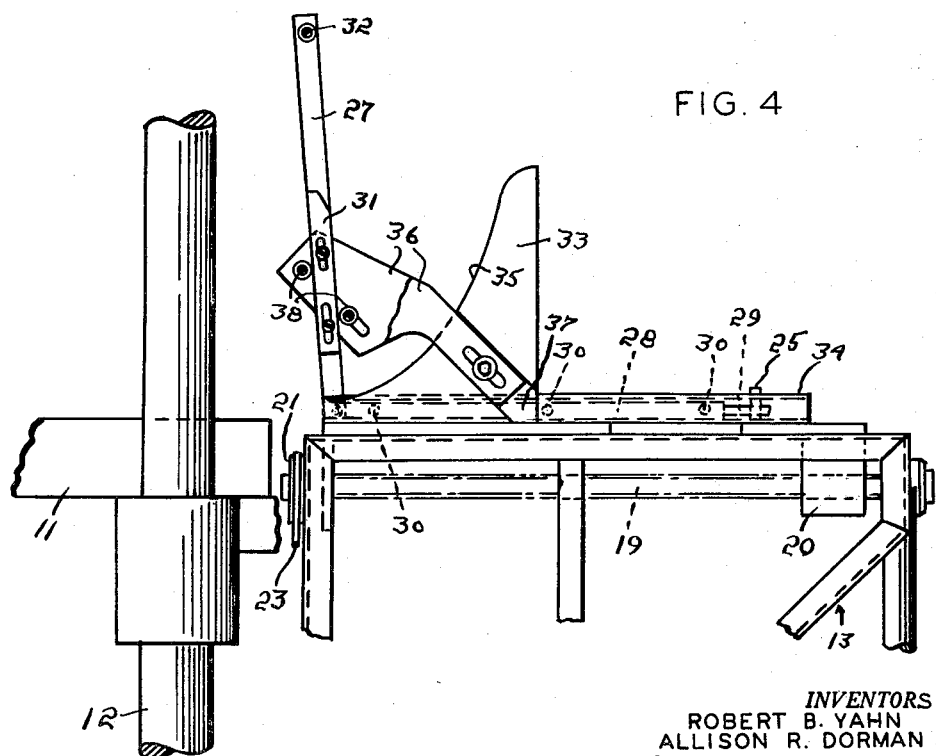

July 25, 1961 R. B. YAHN ET AL 2,993,231
MOULD FEEDING RETRACTING AND OPENING APPARATUS
Filed March 26, 1956 4 Sheets-Sheet 4

INVENTORS
ROBERT B. YAHN
ALLISON R. DORMAN JR.
BY
ATTORNEY

United States Patent Office 2,993,231
Patented July 25, 1961

2,993,231
MOULD FEEDING RETRACTING AND OPENING APPARATUS
Robert B. Yahn and Allison R. Dorman, Jr., both of Crest Road, Monson, Mass.
Filed Mar. 26, 1956, Ser. No. 573,921
6 Claims. (Cl. 18—16)

The present invention relates to apparatus for use in entering into and withdrawing hingedly connected mould parts from a compression type of press.

In the rubber and plastic moulding industries, for example, there is a demand for means for automatically entering a mould into a press, withdrawing the mould therefrom, and breaking open the mould. The potential advantages of such apparatus are several and important among them are that they enable the production cycle to be accelerated, the work load to be lightened as to enable, in many instances, women to replace men, and the risk of personal injury to be minimized.

These advantages can be attained provided that ready access of the operator or operators to the work is not interfered with, and that the apparatus is self contained easy to install, and provides that, once the operator has initiated a cycle after a mould charge has been removed and replaced, the completion of that cycle is automatic but is subject to a dwell during the interval the press is in its closed or operative position.

The principal objective of this invention is to provide apparatus enabling those advantages to be realized and this is accomplished by providing a drive connected to one mould part and operable to reciprocate the mould between a first or loading and unloading position and a second position between the platens when the vertically movable platen is in its open position. Means are associated with the drive to be engaged by the parts of the mould as the mould is being withdrawn to force the parts apart as they move towards said first position and to close them together as they move towards said second position. Additionally, where the extent to which the mould is to be opened is more than 90°, means are employed to positively guide the upper mould part against toppling.

The control, preferably electrical, provides a normally open switch adapted to be momentarily closed by the operator with the reciprocation of the mould from its first position to its second position and back to said first position, being automatic but subject to a dwell in its cycle during the interval the press is closed.

In the accompanying drawings, there is shown an illustrative embodiment of the invention, from which these and other of its objectives, novel features and advantages will be apparent.

Figures 5, 6:
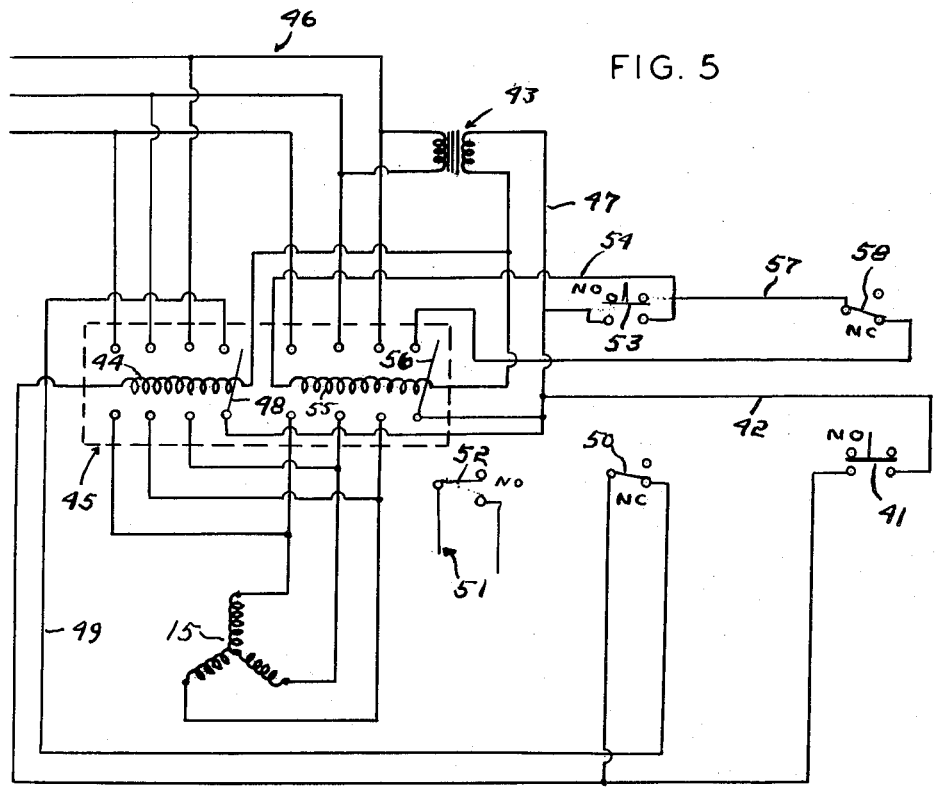

In the drawings:

FIG. 1 is a fragmentary front view of a compression type of a press in accordance with the invention, FIG. 2 is a side view of the press, FIG. 3 is a fragmentary side view showing the upper mould part partly opened, FIG. 4 is a similar view with the upper mould part fully opened, FIG. 5 is a somewhat schematic view showing the control circuits, and FIG. 6 is a fragmentary view illustrating the initiation of the mould withdrawal by the lowering of the vertical mould platen.

In the drawings, a press of the compression type is generally indicated at 10 and is shown as having its lower platen 11 slidably supported by vertical posts 12 for vertical movement, as by a hydraulic ram, not shown, between an upper closed or operative position and a lower open or inoperative position. As the press 10 is conventional, it is not further detailed.

A supporting frame, generally indicated at 13, is shown as attached to the press 10 as at 14. The frame 13 supports a reversible motor 15 and has front and back plates 16 and 17, respectively. The plates 16, 17 are provided with bearings 18 for the lead screw 19 which is threaded through a saddle 20 and provided with an end pulley 21 connected to the pulley 22 of the motor 15 by a belt 23. The saddle 20 is mounted on parallel guide rods 24 carried by the plates 16 and 17 and has vertically disposed pull pins 25. By this construction, the saddle 20 may be moved in one direction or the other depending on the direction in which the motor 15, and accordingly the lead screw 19 is driven.

A mould is generally indicated at 26 and consists of an upper part 27 hingedly connected in a conventional manner to a lower part 28. The mould 26 is conventional except that its lower part 28 has tongue sockets 29 for the pull pins 25 and followers 30 and the upper part 27 has adjustable shoes 31 as may be best seen in FIGS. 3 and 4, and followers 32. The tongue sockets 29, while disengaged from the pull pins 25 when the press 10 is closed, receive the pins when the lower platen 11 is in its open or lowered position, see FIG. 6.

The frame 14 is also provided with members 33, one on each side of the saddle 20 provided with a track in the form of a channel 34 for the followers 30 on the corresponding side of the bottom mould part 28 while their upper edges constitute cam surfaces 35 engageable by the followers 32 of the upper mould part 27 thus forcing said upper part upwardly and, in practice, the cams 35 are not identical in order to "crack" the mould at one side.

Where it is desired to so open the mould that its upper part 27 must be swung through an arc of more than 90°, mounts 36 are employed. These are shown as adjustably locked in slots 37 in the members 33 and provided with spaced rollers 38 at each side disposed to receive between them a respective one of the shoes 31 when the mould has been opened to a predetermined extent. The function of the mounts 36 is to guide and support the upper mould part 27 as it opens into positions requiring support against toppling and then to guide it, as the mould is being closed, until its followers 32 re-engage with the cam surfaces.

The preferred motor control means are detailed in FIG. 5. It will be assumed that the mould parts are in their loading or unloading position. After the mould has been charged, the operator closes the normally open switch 41, closing momentarily the lead 42 from the transformer 43 to the coil 44 of the generally indicated reversing magnetic contactor 45 thus to energize and rotate the motor 15 in a direction to advance the saddle 20 and hence carry the mould parts towards their second position. The primary of the transformer 43 is connected to the power circuit 46. Its secondary is connected to the control circuit 47 including the lead 42.

When the coil 44 is energized, switch 48 in its holding lead 49 is closed. The lead 49 is provided with a normally closed switch 50 opened, when the mould is in its second position, to break the holding circuit thus to stop the motor 15.

Presses of the type under consideration may be manually or automatically closed with a control circuit being indicated at 51 and including a normally open switch 52 disposed to be closed as by the saddle 20 when the mould is in its second position. Commonly, such presses, as the press 10, are controlled by timing circuits so that the vertically moved platen is moved into open position automatically. Whether by this means or otherwise, the lower platen 11 trips a normally open switch 53 momentarily closing the lead 54 of the circuit 47 through the coil 55 of the magnetic contactor 45 which reverses the circuit to the motor 15 thus to rotate the screw in a mould retracting direction and closes the normally open switch 56 in the holding circuit 57 whose normally closed switch 58 is opened by the saddle 20 when the moulds are in their first position thus completing the cycle. This cycle is automatic but is subject to a dwell for whatever period the press 10 is closed.

From the foregoing, it will be apparent that the invention provides simple and effective means for feeding a charged mould into an open press, withdrawing said mould after its charge has been cured, and opening the mould while it is being withdrawn.

What we therefore claim and desire to secure by Letters Patent is:

1. A device for entering and withdrawing a mould having hingedly interconnected upper and lower parts from a compression type of press having one of its platens vertically movable between closed and open positions relative to another platen thus to permit such entrance and withdrawal, a drive operable to reciprocate said mould between a first loading and unloading position and a second position between said platens, connecting means between said drive and one of said mould parts only when said movable platen is approximately in said open position, and cam means associated with said drive engeable with said mould parts to force them open as they move towards said first position and to close them together as they move towards said second position.

2. A device for entering and withdrawing a mould having hingedly interconnected upper and lower parts from a compression type of press having one of its platens vertically movable between closed and open positions relative to another platen thus to permit such entrance and withdrawal, a drive operable to reciprocate said mould between a first loading and unloading position and a second position between said platens, connecting means between said drive and one of said mould parts only when said movable platen is approximately in said open position, and cam means associated with said drive engageable with said mould parts to force them open as they move towards said first position and to close them together as they move towards said second position, and common supporting structure in which said drive and said means are arranged one above the other, said structure being attachable to said press at one side thereof.

3. A device for entering and withdrawing a mould having hingedly connected upper and lower parts from a compression type of press having its lower platens vertically movable between closed and open positions relative to the upper platen thus to permit such entrance and withdrawal, a drive operable to reciprocate said mould between a first loading and unloading position and a second position between said platens, said drive and said lower mould part including portion interengaging adjacent their proximate edges in said open position, and cam means associated with said drive to force said mould parts open as they move towards said first position and to close them together as they move towards said second position.

4. A device for entering and withdrawing a mould having hingedly interconnected upper and lower parts from a compression type of press having one of its platens vertically movable between closed and open positions relative to another platen thus to permit such entrance and withdrawal, a drive operable to reciprocate said mould between a first loading and unloading position and a second position between said platens, connecting means between said drive and one of said mould parts only when said movable platen is approximately in said open position, cam means associated with said drive engageable with said mould parts to force them open as they move towards said first position and to close them together as they move towards said second position, and a single cycle control for said drive including an operator controlled cycle initiating device operable when said mould parts are in said first position, means producing a dwell in said cycle when said mould parts are in said second position, and means terminating said dwell when said vertically movable platen moves from its closed position to its open position.

5. In a device for entering and withdrawing a mould having hingedly connected upper and lower parts from a compression type of press having one of its platens vertically movable between closed and open positions relative to another platen thus to permit such entrance and withdrawal, a drive connected to one mould part in said open position and operable to reciprocate said mould between a first loading and unloading position and a second position between said platens, and means associated with said drive to force said mould parts open as they move towards said first position and to close them together as they move towards said second position, said means including tracks and followers for said lower part, tracks and followers for said upper part arranged with the followers carried by said upper part and the tracks upwardly inclined and disposed to cause said upper part to swing through an arc of approximately 90° and then disengage therefrom, said upper parts also including shoes, and holders engageable with said shoes being disposed to receive and guide said upper mould part when it is opened approximately 90° with respect to said lower part.

6. A device for entering and withdrawing a mould having hingedly connected upper and lower parts from a compression type of press having one of its platens vertically movable between closed and open positions relative to another platen thus to permit such entrance and withdrawal, a drive including a reversible motor and a reversible control having a delivery position and a retracting position, said drive being connected to said lower mould part in said open position and operable to reciprocate said mould between a first loading and unloading position and a second position between said platens, means associated with said drive engageable with said mould parts to force them open as they move towards said first position and to close them together as they move towards said second position, and operating means including first and second operating circuits, said first circuit including a normally open switch to be momentarily closed by the operator and said reversible control, to effect its delivery position, a first holding circuit including a normally closed switch opened by said drive when the mould reaches its second position, and said second operating circuit including a normally open switch closed by said vertically movable platen as it moves towards its open position to effect its retracting position and a second holding circuit including a normally closed switch opened by said drive when the mould reaches its first position.

References Cited in the file of this patent
UNITED STATES PATENTS

| | | |
|---|---|---|
| 2,171,511 | Winegar et al. | Aug. 29, 1939 |
| 2,347,972 | Scott et al. | May 2, 1944 |
| 2,431,048 | Kilborn | Nov. 18, 1947 |
| 2,565,248 | Lyijynen | Aug. 21, 1951 |